Nov. 26, 1935.  F. C. BERNTHAL  2,022,335
ROTARY GARDEN RAKE AND CULTIVATOR
Filed Sept. 21, 1934  2 Sheets-Sheet 1

Inventor
Fred C. Bernthal

By Clarence A. O'Brien
Attorney

Nov. 26, 1935.   F. C. BERNTHAL   2,022,335

ROTARY GARDEN RAKE AND CULTIVATOR

Filed Sept. 21, 1934   2 Sheets-Sheet 2

Inventor
Fred C. Bernthal

By *Clarence A. O'Brien*
Attorney

Patented Nov. 26, 1935

2,022,335

UNITED STATES PATENT OFFICE 2,022,335

ROTARY GARDEN RAKE AND CULTIVATOR

Fredrick Carl Bernthal, Worden, Ill.

Application September 21, 1934, Serial No. 744,993

1 Claim. (Cl. 97—52)

The present invention relates to a rotary garden rake and cultivator and has for its object to provide a device of this nature which is easy to use, works the ground well, and may be used quickly.

Another important object of the invention resides in the provision of a rotary garden rake and cultivator of this nature which is simple in its construction, inexpensive to manufacture, strong and durable, and thoroughly reliable and efficient in operation.

With the above and numerous other objects in view as will appear as the description proceeds, the invention consists in certain novel features of construction, and in the combination and arrangement of parts as will hereinafter be more fully described and claimed.

Figure 1:
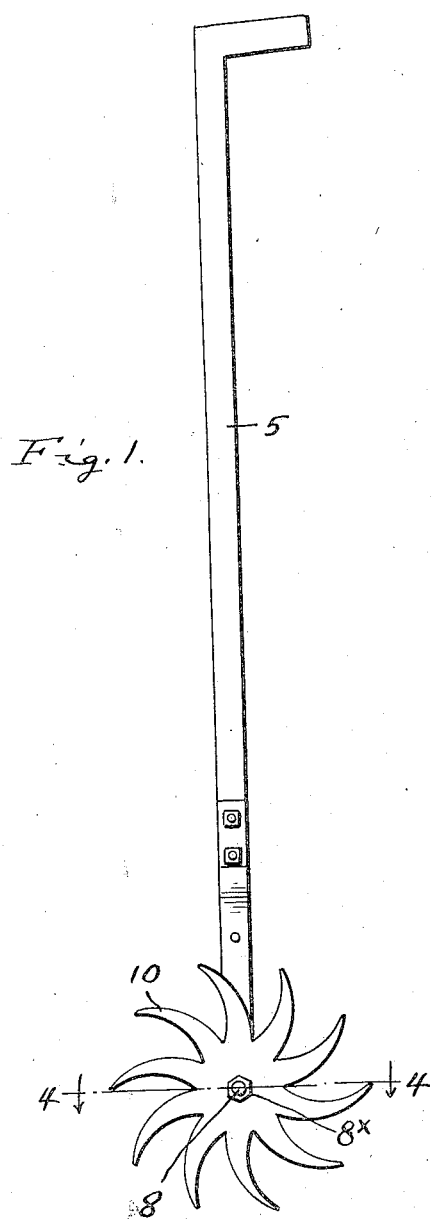
Figure 1 is a side elevation of a device embodying the features of my invention.
Figure 2:
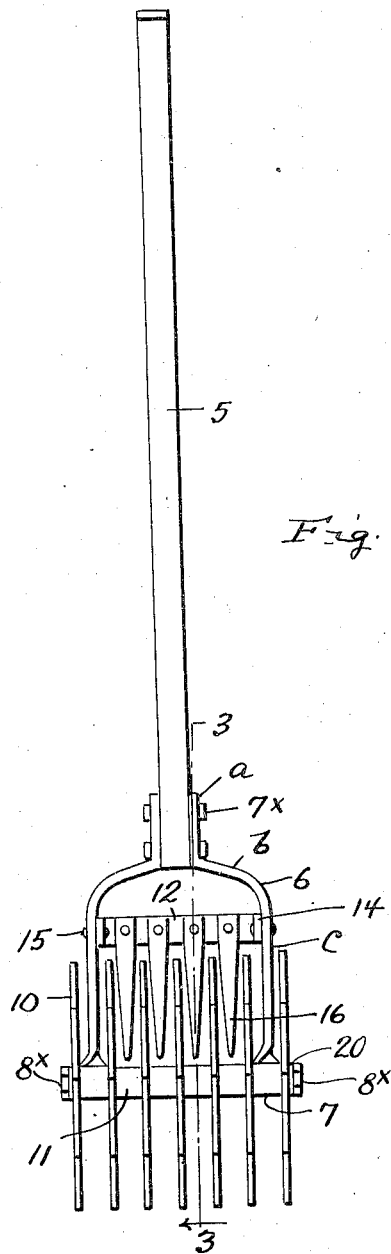
Figure 2 is a rear elevation thereof.
Figure 3:
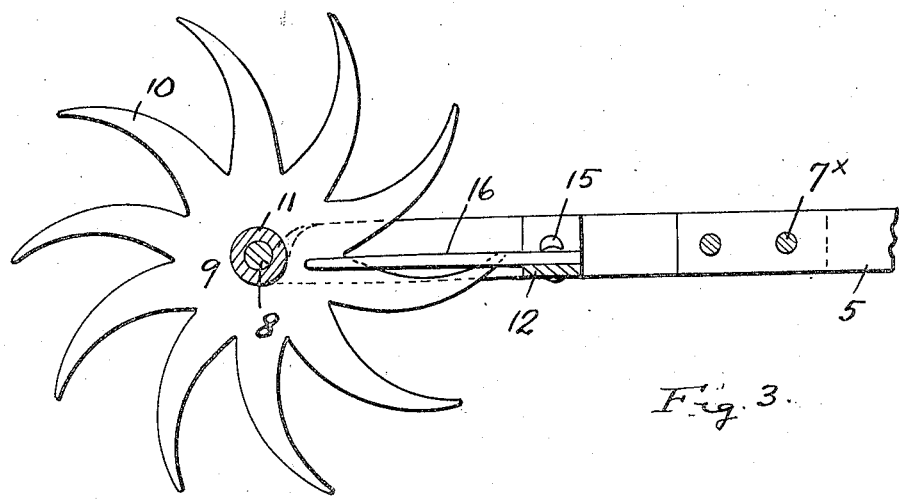
Figure 3 is a longitudinal section taken substantially on the line 3—3 of Figure 2.
Figure 4:
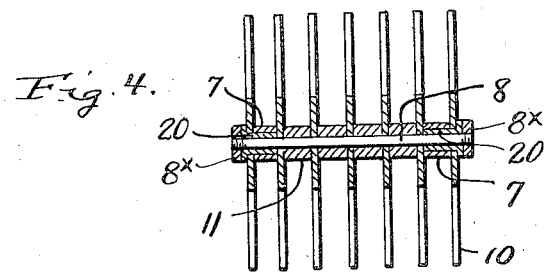
Figure 4 is a sectional view taken substantially on the line 4—4 of Figure 1.
Figure 5:
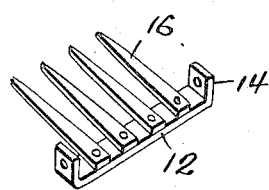
Figure 5 is a detail perspective view showing the rake.
Figure 6:
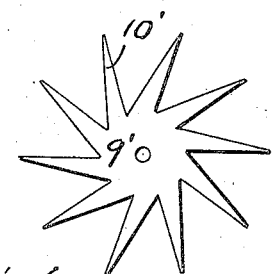
Figure 6 is an elevation of another embodiment of disks.

Referring to the drawings in detail it will be seen that the numeral 5 denotes an elongated handle on the lower end of which is a yoke formed of two members 6, 6, each member 6 comprising an ear $a$ bolted to the handle 5 as at $7x$ and merging into an outwardly extending arm $b$ which in turn merges into a downwardly extending arm $c$ the end of which terminates in a sleeve 7. The two sleeves 7 are alined with each other to receive axle 8 which is threaded at its ends to receive retaining nuts $8x$, Figures 1, 2 and 4. On this axle 8 there are centrally apertured disks 9 having radiating therefrom curved teeth 10. Spacing sleeves 11 are provided between the disks. In Figure 6 I have shown another embodiment of the disk. Mounted on the axle 8 and extending into the sleeves or eyes 7, Figure 4, are bushings 20, flanged at their outer ends to bear against the outermost disks 9. The nuts $8x$ are set against the outer ends of the bushings 20 and in consequence the construction is not only strong and durable but is of such a character that anyone of the disks may be readily removed if worn or broken and replaced with a new disk, without the employment of skilled labor. It will also be noticed that the outermost disks 9 are exterior to the space between the arms $c$ with the result that the rotary portion of the device is increased in width and at the same time the arms $c$ are utilized for clearance purposes between the outermost disks 9 and the next inner disks 9. Here the disks 9' are provided with straight pointed teeth 10' which are disposed substantially tangentially to the center of the disk.

Numeral 12 denotes a cross head having upturned ends 14 secured by suitable means 15 to the arms $c$ of the members 6 adjacent the arm $b$. Flat like pointed tines 16 are secured at their larger ends to the cross head 12 and project forwardly between the disks.

In use this device is pushed along the ground and the teeth of the disks dig into the ground for cultivating purposes and the tines prevent clogging of dirt between the teeth.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

The combination in a device of the class described, of yoke arms terminating in sleeves or eyes, flanged bushings disposed in said sleeves or eyes, an axle disposed in and extending between said bushings and outwardly beyond the same and having threaded ends, retaining nuts on said axle ends, centrally apertured, spaced disks surrounding the axle and having peripheral teeth, two of said disks being outside of said arms and the remainder between the arms, spacing sleeves mounted on the axle and interposed between the disks intermediate of the sleeves or eyes on the arms, and forwardly extending tines arranged between and connected with the yoke arms and disposed between some of the disks.

FREDRICK CARL BERNTHAL.